(12) United States Patent
Feldtkeller

(10) Patent No.: US 6,310,468 B1
(45) Date of Patent: Oct. 30, 2001

(54) CIRCUIT ARRANGEMENT FOR A TIMED POWER SUPPLY

(75) Inventor: Martin Feldtkeller, Munich (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 09/550,224

(22) Filed: Apr. 14, 2000

(30) Foreign Application Priority Data

Apr. 14, 1999 (DE) .............................................. 199 16 914

(51) Int. Cl.$^7$ ...................................................... G05F 1/40
(52) U.S. Cl. .............................................................. 323/282
(58) Field of Search ...................................... 323/282, 305, 323/311, 312, 265, 268, 271, 272, 350, 351, 290

(56) References Cited

U.S. PATENT DOCUMENTS

| | | | |
|---|---|---|---|
| 4,485,431 | 11/1984 | Ishiguro | 363/20 |
| 6,040,686 | * 3/2000 | Schenkel | 323/282 |

FOREIGN PATENT DOCUMENTS

| | | |
|---|---|---|
| 2 614 154 A1 | 10/1988 | (FR) . |
| 08-149804 | * 6/1996 | (JP) . |

OTHER PUBLICATIONS

*Halbleiterschaltungstechnik*(Tietze, U. and Schenk, Chapter 10, ed., 1993, Springer: pp. 561–576.

* cited by examiner

*Primary Examiner*—Peter S. Wong
*Assistant Examiner*—Gary L Laxton
(74) *Attorney, Agent, or Firm*—Schiff Hardin & Waite

(57) ABSTRACT

The invention relates to a circuit arrangement for a timed power supply having an integrated circuit connected to first and second supply potential terminals and includes a switching mechanism, a control circuit that controls the switching mechanism, and a first diode. A coil is additionally provided, which is connected to the switching mechanism and to a first output terminal. A load is connected between the first output terminal and a second output terminal and a first charge storage unit is connected in parallel with the load. The switching mechanism includes a first and a second semiconductor switch. This makes possible a timed power supply that features a low power loss and a low electromagnetic radiation.

11 Claims, 4 Drawing Sheets

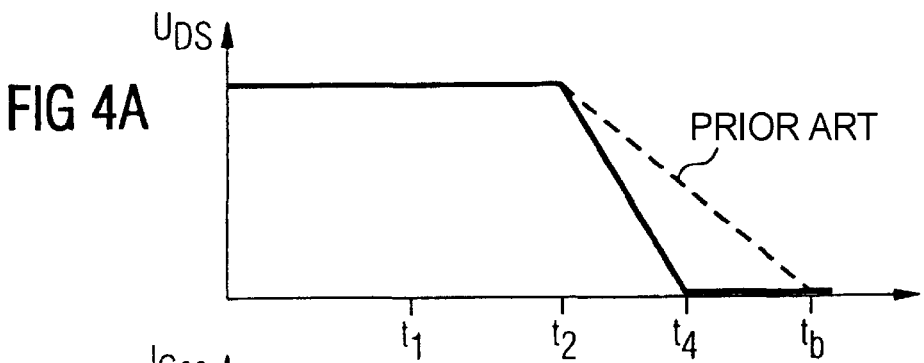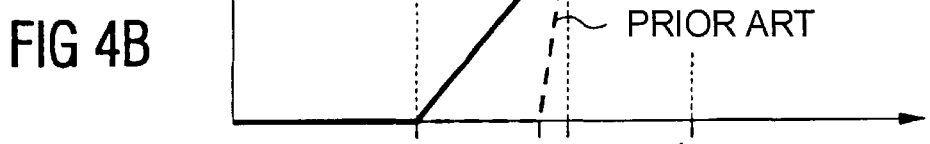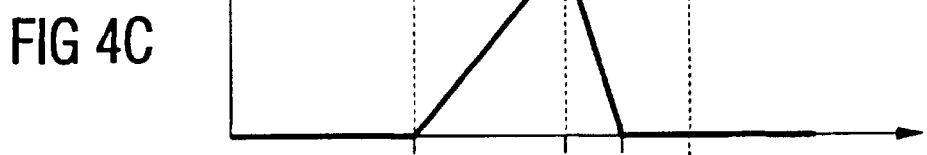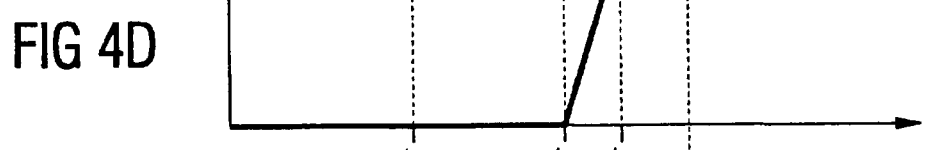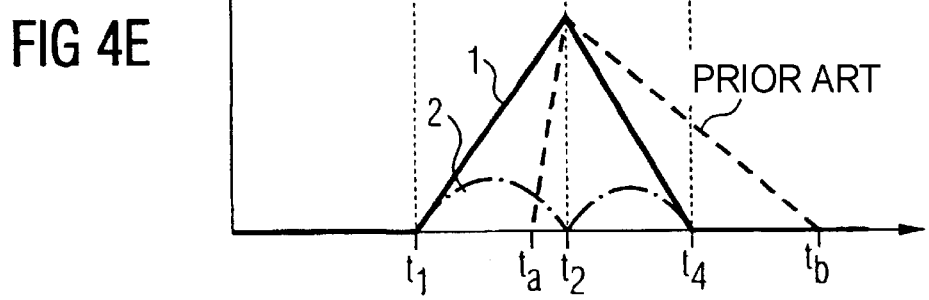

CIRCUIT ARRANGEMENT FOR A TIMED POWER SUPPLY

BACKGROUND OF THE INVENTION

The present invention relates to a circuit arrangement for a timed power supply having an integrated circuit that is connected to first and second supply potential terminals and that comprises a switching mechanism, a control circuit that controls the switching mechanism, and a diode. A coil is also provided, which is connected to the switching mechanism and to a first output terminal. A load is connected between the first and second output terminals and a charge storing device is connected in parallel with the load.

Circuit arrangements for timed switched-mode regulators are taught in a wide variety of configurations. For example, the principal mode of functioning and constructing and operating secondarily timed switched-mode regulators and primarily timed switched-mode regulators is detailed in the book Halbleiterschaltungstechnik (Tietze, U. and Schenk, Ch.; $10^{th}$, ed,1993, Springer:561–576). Besides down converters and up converters, secondarily timed switched-mode regulators also include inverting converters. The advantage of these switched-mode regulators is that a separate transformer is not required, but rather only a storage choke. In the simplest case, secondarily timed switched-mode regulators consist of three components only; namely, a switching transistor, the aforementioned storage choke, and a smoothing capacitor. The switching transistor is constructed as a two-way switch. The two-way switch can be eliminated, however, by including a simple on-off switch in one branch of a down converter and providing a diode in the other branch.

A variety of integrated circuits are known for realizing these types of switched-mode regulators. In the above cited book, on page 567, an integrated module L296 from SGS is described, which internally comprises the series circuit of a bipolar transistor and a freewheeling diode as well as a control circuit for switching the switching transistor on and off.

Down converters, also known as step-down regulators, are used primarily where a low supply voltage must be generated from a high supply voltage with a high degree of effectiveness. In particular, it is noted that a high degree of effectiveness is important above all other considerations in battery-operated devices, for example. Besides achieving a high degree of effectiveness, the heating of electronic components by dissipated power is also of primary importance. This is the case particularly in automotive electronics applications. Despite a high degree of effectiveness, timed power supplies have not previously been applied in automotive electronics due to the lack of electromagnetic compatibility. Instead, linear regulators have been used to generate a regulated supply voltage, though these heat up intensely in operation.

Linear regulators are typically operated in automotive electronics with a nominal current of 400 mA. At a lateral bipolar transistor, the difference between the input voltage and the output voltage drops. The product of the difference between the input and the output voltages and the nominal current is converted into heat loss. The larger the voltage difference between the input and output of the bipolar transistor, the higher the losses. Therefore, due to the sharply rising power loss, it is inappropriate to use a linear regulator in a 42-volt vehicle network. It is therefore desirable to use a switched-mode regulator for load currents of approximately 1 A.

As mentioned above, for reasons of electromagnetic compatibility (EMC), switched-mode regulators have not been used in the automotive field. One possibility for realizing a low EMC radiation is to select a very low timing frequency of the power supply (i.e., in the range from 10 to 40 kHz) and to switch the switching transistor slowly. In this way, the power loss generated by the switching losses can be limited. On the other hand, however, the use of large storage chokes and smoothing capacitors would then be necessary, which are very costly in terms of space and money.

Thus, another possible solution is to use resonance converters, which, with additional resonant circuit elements (coils and capacitors) and diodes, would make possible an approximately sinusoidal voltage and current characteristic. However, resonance converters load the constituent components with higher currents or voltages and also require a significantly higher number of components. Furthermore, the control range with respect to load oscillations and input voltage oscillations is limited.

SUMMARY OF THE INVENTION

The present invention is, thus, advantageous by providing a circuit arrangement for a timed power supply that satisfies the requirements in terms of electromagnetic compatibility, on the one hand, and only generates a small amount of power loss, on the other hand.

This and other advantages are inventively achieved with a circuit arrangement having first and second supply potential terminals and first and second output terminals. Additionally, a circuit arrangement includes a first charge storage unit and an integrated circuit connected to the first and second supply potential terminals. The integrated circuit has a switching mechanism comprised of a first semiconductor switch and a second semiconductor switch, a control circuit that controls the switching mechanism and a diode. An end of a coil is connected to the switching mechanism and the other end of the coil is connected to the first output terminal. Finally, a load is connected between the first output terminal and the second output terminal and is also connected in parallel with the first charge storage unit. With this arrangement, it is thus possible to generate slow switching edges, even given high clock frequencies, thereby minimizing the heating of the semiconductor switch.

An important consideration of the present invention is that electromagnetic radiation is caused predominantly by short current rise times of the switching processes, whereas steep voltage rises given a constant current are of secondary importance for electromagnetic compatibility. However, available timed power supplies generate slow voltage edges and fast current transitions, which cannot satisfy the requirements of EMC. The generation of a slow current transition and a relatively fast voltage edge is made possible with the switching mechanism of the present invention, which includes a first and a second semiconductor switch.

The first and second semiconductor switches of the present invention are advantageously connected with their load paths in parallel and are controlled by the control unit separately. The semiconductor switches are designed such that, given the same inception voltage, the first semiconductor switch is capable of carrying a larger current than the second semiconductor switch. The first semiconductor switch features a low activation resistance, which, in conjunction with its gate-drain capacity, guarantees a sufficiently high steepness of the voltage edges. The second semiconductor switch is selected such that its drain saturation current is exactly enough to accept the entire load current. To activate, the gate-source voltage is slowly increased from a value below the inception voltage to its maximum value with a definite edge steepness. To deactivate, the gate-source voltage is reduced again with a comparable edge steepness. The desired slow edge steepness of the current can be adjusted very easily at the second semiconductor switch, which has a small surface area and thus a small input capacity. This results in the requisite low rate of current rise and, thus, low electromagnetic radiation.

By providing two semiconductor switches in the switching mechanism, the current rise rate and the voltage rise rate may be selected independently of one another. The two semiconductor switches are advantageously controlled such that the second semiconductor switch is switched on before the first semiconductor switch. It is also advantageous when the second semiconductor switch is turned off after the first semiconductor switch. The result of this is that the load current essentially always flows via a single semiconductor switch. Only for a short time in the switching processes does splitting of the load current occur, which can enhance the current rise shortly before the nominal current is reached, depending on the time transition of the current from the first semiconductor switch to the second. But by then the electromagnetic radiation is no longer critical.

In a preferred embodiment of the present invention, a series circuit consisting of a first resistor and the load path of the second semiconductor switch is connected in parallel to the load path of the first semiconductor switch. The first resistor is preferably comprised of a discrete component. The first resistor can be selected such that the nominal voltage drops across the first resistor, given a nominal voltage at the first supply potential terminal and maximum load current through the second semiconductor switch. Thus, the heat loss occurs primarily in the resistor, which is located outside the integrated circuit. This prevents an intense heating of the integrated circuit. In the ideal case, in switching processes with a linear rise and with no wait time between the switching processes of the first and second semiconductor switches, the first resistor accepts approximately 75% of the switching heat losses. As a result, only 25% of the heat loss must be managed by the integrated circuit. The resistor's share of the heat loss can be increased even further when a wait time is provided between the switching processes of the first and second semiconductor switches. The advantage of this development is that the power loss in the integrated circuit can be minimized very easily and economically.

In another preferred embodiment of the present invention, a series circuit consisting of a second charge storage device, a second diode, and the load path of the second semiconductor switch is connected in parallel to the load path of the first semiconductor switch. In addition, a second resistor is connected to the diode and to the first output terminal. The second charge storing device is preferably comprised of a discrete component, while the second resistor and the second diode can be provided in the integrated circuit. This development is particularly advantageous when the voltage rise (i.e., the switching process of the first semiconductor switch) is selected significantly faster than the current rise conditioned by the second semiconductor switch. This affords the additional advantage that the overall heat loss is very low.

The control device advantageously comprises a clock pulse generator, pulsewidth modulator, and a drive arrangement for the switching mechanism.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 4A–4E illustrate the voltage current time characteristics at the semiconductor switches and the resulting power loss.

DETAILED DESCRIPTION OF THE PREFERRED EMBODIMENTS

Figure 1:
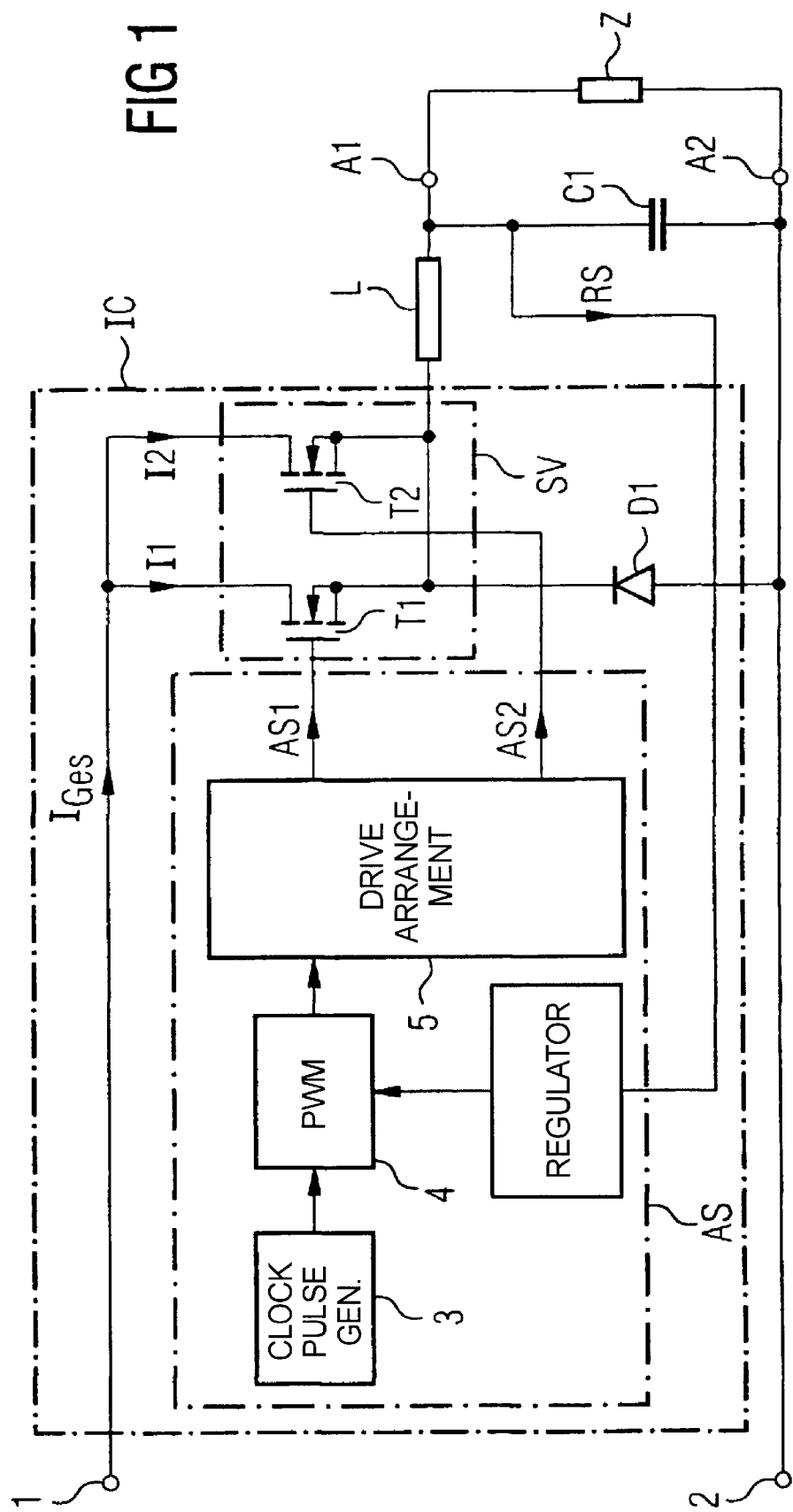
FIG. 1 illustrates a circuit arrangement according to an embodiment of the present invention.

FIG. 1 shows an embodiment of the inventive circuit arrangement for a timed power supply. The inventive circuit arrangement comprises an integrated circuit IC that is connected to a first supply potential terminal 1 and a second supply potential terminal 2. A control circuit AS, which controls a switching mechanism SV, is also provided in the integrated circuit IC. The switching mechanism SV is connected to the first supply potential terminal 1 at the input side. At the output side, the switching mechanism SV is connected to a first output terminal A1 via a coil L. A load Z is provided between the first output terminal A1 and a second output terminal A2. The load Z is connected in parallel to a first charge storage device C1. The coil L, the first charge storage device C1, and the load Z are all located outside the integrated circuit IC. The first output terminal A1 is connected to the control circuit AS via a feedback branch RS. The control circuit AS comprises a clock pulse generator 3, a pulsewidth modulator 4, and a drive arrangement 5. The drive arrangement 5 generates a first control signal AS1 and a second control signal AS2, which are respectively fed to a first semiconductor switch T1 and a second semiconductor switch T2 of the control device SV.

In the embodiment of FIG. 1, the first and second semiconductor switches T1 and T2 are MOSFETs, although bipolar transistors or other arbitrary controllable switches may be used instead. The MOSFETs T1 and T2 are connected with their drain-source paths in parallel, wherein the drain terminals are connected to the first supply potential terminal 1. An operating voltage is applied to the first supply potential terminal 1, while a reference potential (i.e., earth or ground) is present at the second supply potential terminal 2. The source terminals of the MOSFETs T1 and T2 are connected to the first terminal of the coil L.

The MOSFETs T1 and T2 are selected such that, given the same inception voltage (i.e., gate-source voltage), the first MOSFET T1 can carry a high current, whereas the second MOSFET T2 carries a significantly lower current. Hence, it necessarily follows that the MOSFET T1 has a significantly greater number of MOS cells than the MOSFET T2. Between the source terminals of the MOSFETs T1 and T2 and the second supply potential terminal 2, a first diode D1 is provided, wherein the anode terminal is connected to the second supply potential terminal 2.

The operation of the inventive circuit arrangement is detailed with the aid of FIGS. 4A to 4E. FIG. 4A shows the drain-source voltage of the semiconductor switches T1 and T2, while FIG. 4B represents the corresponding total current $I_{Ges}$ to the parallel arrangement of the switches T1 and T2. The broken curves represent the switching behavior of an arrangement according to the prior art. At time $t_a$ a semiconductor switch of the prior art is turned on. By time $t_2$ the total current $I_{Ges}$ has risen to its nominal current value IN The current rise rate of the prior art is relatively steep. From the time $t_2$ the current remains at its nominal current value $I_N$. On the other hand, at time $t_2$ the drain-source voltage $U_{DS}$ drops until time $t_b$. The steep current rise and the relatively flat drop of the drain-source voltage condition a high electromagnetic radiation, which is particularly disadvantageous in applications in motor vehicles. FIG. 4E shows the corresponding power loss as a broken line. The power loss is represented by the area under the broken line.

In accordance with the considerations of the present invention, it is advantageous to reduce the rate of current rise; that is, the time difference between switch activation and the attainment of the nominal current IN (i.e., $t_2-t_1$) must be increased compared to the prior art (i.e., $t_2-t_a$). The flat current rise is achieved by means of the second MOSFET T2, as is represented in FIG. 4C. In the activation operation, the gate-source voltage of the second MOSFET T2 is elevated slowly from a value below the inception voltage to a maximum value with a definite edge steepness, as illustrated in FIG. 4C. The lower edge steepness can be easily set in a MOSFET with a small area and a small input capacity, such as MOSFET T2.

At time $t_2$, when the second MOSFET T2 is carrying the entire load current within it, the first MOSFET T1 is switched on with a high rate of current rise, so that at time $t_3$ it now carries the entire nominal current as shown in FIG. 4D, while the MOSFET T2 is already blocking again as illustrated in FIG. 4C. The addition of the currents I1 and I2 produces the total current in FIG. 4B. When the semiconductor switches T1 and T2 are controlled such that the first MOSFET T1 is turned on at the beginning of the deactivation of the second MOSFET T2, and with the attainment of time $t_3$ the second MOSFET T2 is blocking, whereas the first MOSFET T1 accepts the entire load current, then the ramp-shaped current characteristic $I_{Ges}$, as represented in FIG. 4B, is produced.

The current characteristic illustrated in FIGS. 4B to 4D represents the ideal case. On the other hand, it is also conceivable to activate the first MOSFET T1 prior to time $t_2$, or shortly thereafter, since this does not have any significant effect on the electromagnetic compatibility or on the power loss that is generated. The power loss characteristic is referenced as 1 in FIG. 4E.

Figure 2:
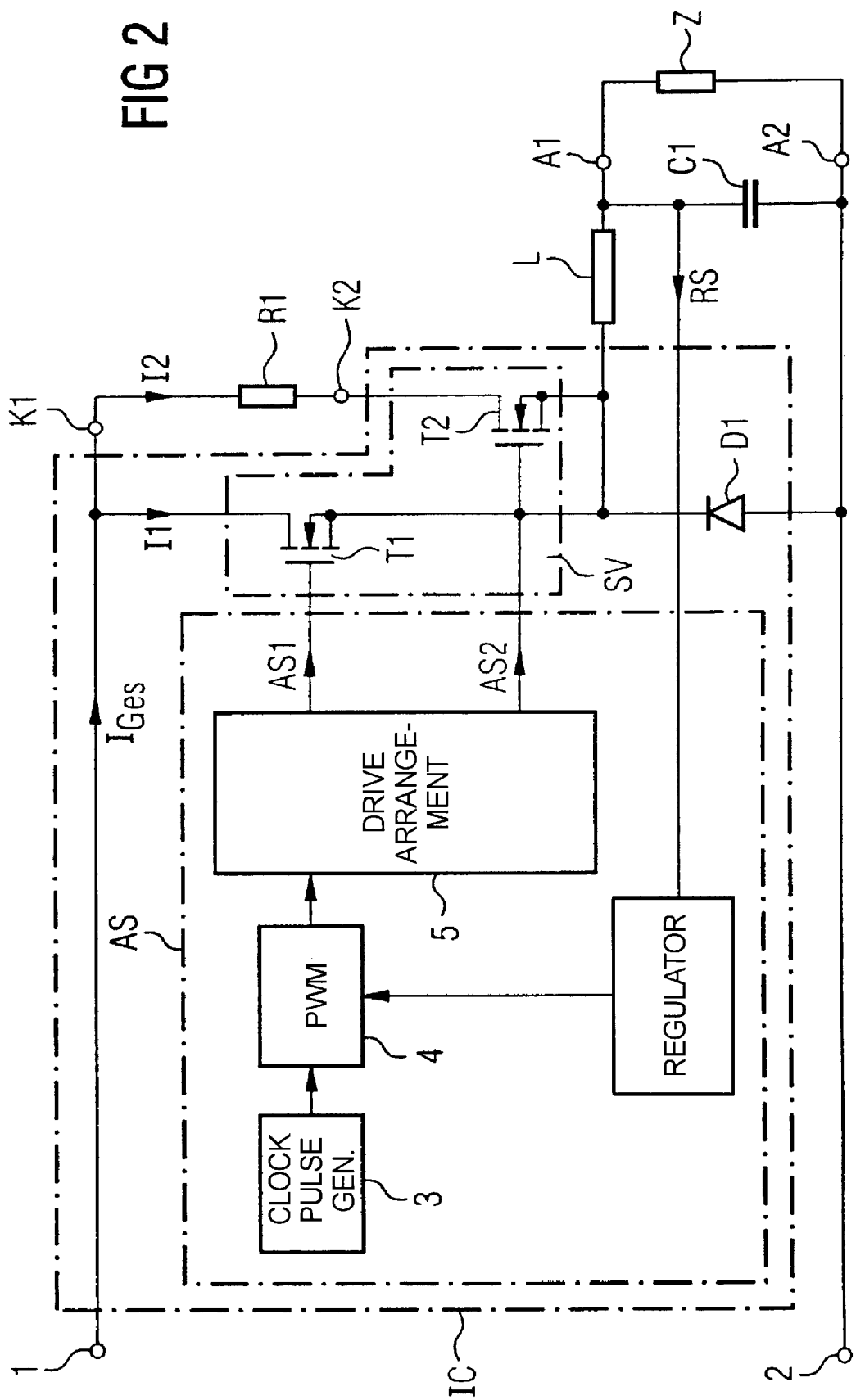
FIG. 2 illustrates a circuit arrangement according to another embodiment of the present invention.

FIG. 2 shows a second embodiment of the inventive circuit arrangement. This embodiment differs from the embodiment in FIG. 1 only in that a first resistor R1 is connected between the drain terminal of the second MOSFET T2 and the first supply potential terminal 1. Hence, the series circuit comprised of a first resistor R1 and the drain-source path of the second MOSFET T2 is connected in parallel to the drain-source load path of the first MOSFET T1. The first resistor R1 is located outside the integrated circuit IC. By this arrangement, a large part of the accruing power loss can be dissipated in the first resistor R1, so that the characteristic represented by broken curve 2 in FIG. 4E represents the power loss that is dissipated in the integrated circuit IC (i.e., MOSFET T2 in the IC).

Figure 3:
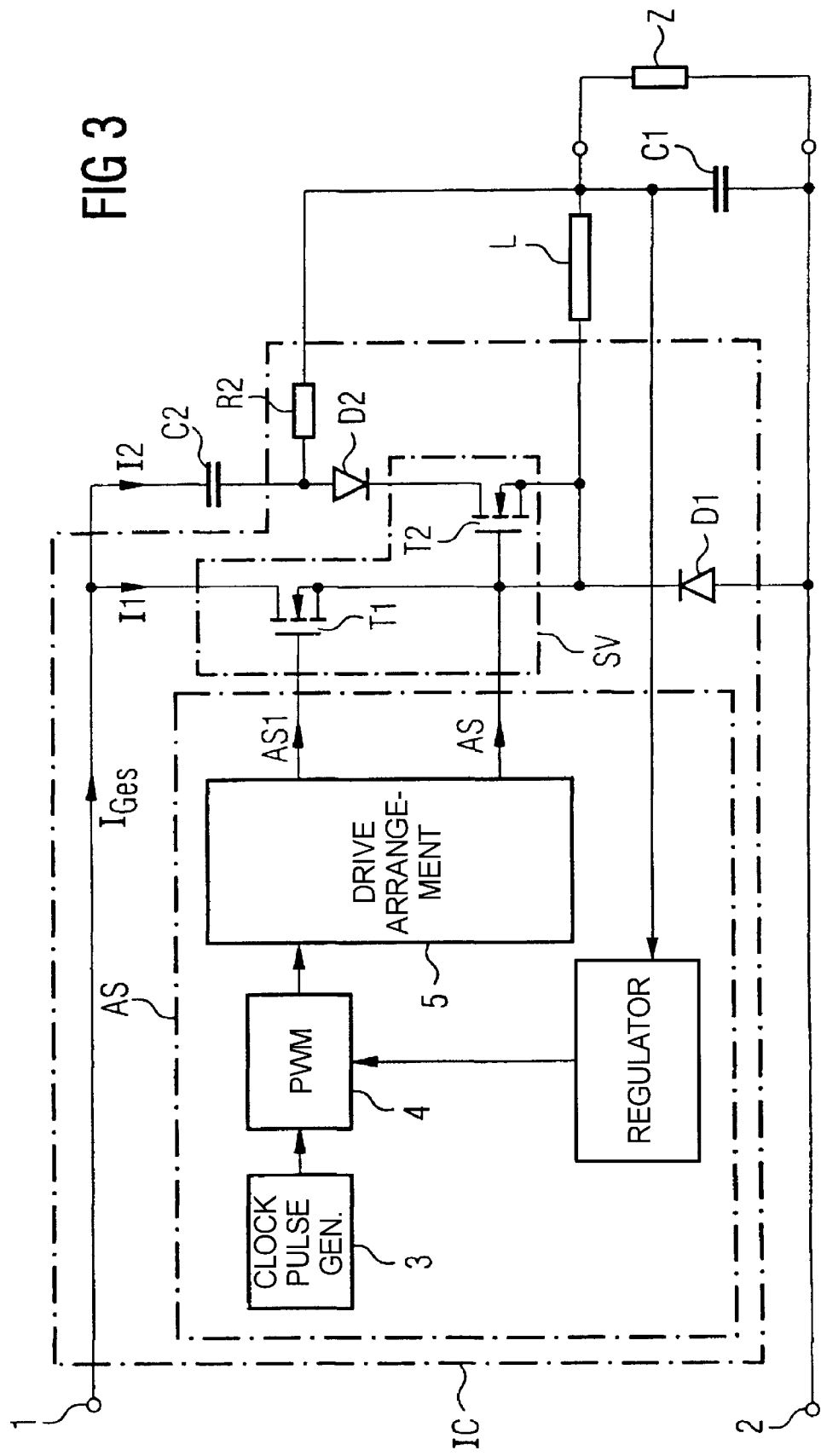
FIG. 3 illustrates a circuit arrangement according to yet another embodiment of the present invention.

FIG. 3 shows another embodiment of the inventive circuit arrangement. Here, the first resistor R1 from FIG. 2 is replaced by a series circuit consisting of a second charge storage unit C2 and a second diode D2. The cathode of the second diode D2 is connected to the drain terminal of the second semiconductor switch T2, whereas the anode terminal is connected to the second charge storage unit C2. The interconnection point or node between the second charge storage unit C2 and the second diode D2 is connected to the first terminal of a resistor R2, whose other terminal is connected to the first output terminal A1. The second charge storage unit C2 is advantageously arranged outside the integrated circuit IC, while the second resistor R2 and the second diode D2 can be integrated on the integrated circuit IC.

The circuit of FIG. 3 affords further reduction of the power loss of the second semiconductor switch T2. The second charge storage unit C2 is charged up to the difference voltage between the first supply potential terminal 1 and the first output terminal A1. When the first semiconductor switch T1 is off, the voltage at the output terminal A1 drops across the drain-source path of the second semiconductor switch T2 with a resulting power loss that is very small. During this time, the current of the coil L flows slowly across the first diode D1 to the first charge storage unit C1. When the first semiconductor switch T1 is switched on and off, the current transfers very rapidly from the second semiconductor switch T2 to the first semiconductor switch T1 (and vice versa).

The above described wiring design has the advantage that only one external component (i.e., second charge storage unit C2) is at most required. As a result, it is possible to minimize the area enclosed by the integrated circuit IC and the external second charge storage unit C2. Furthermore, in the embodiment of FIG. 3 the electromagnetic radiation is reduced to an absolute minimum. This embodiment is particularly advantageous when the voltage rise (i.e., the switching process of the first semiconductor switch T1) is selected to be significantly faster than the current rise, which is conditioned by the second semiconductor switch T2. The heat loss that occurs is, thus, significantly reduced once again.

While this invention has been described in connection with what is presently considered to be the most practical and preferred embodiments, it is to be understood that the invention is not limited to the disclosed embodiments, but, on the contrary, is intended to cover various modifications and equivalent arrangements included with the spirit and scope of the appended claims.

What is claimed is:

1. A circuit arrangement for a timed power supply, the circuit arrangement comprising:

a first supply potential terminal;

a second supply potential terminal;

a first output terminal;

a second output terminal;

a first charge storage unit;

an integrated circuit connected to the first and second supply potential terminals and having a switching mechanism comprised of a first semiconductor switch and a second semiconductor switch, a control circuit that controls the switching mechanism by actuating the second semiconductor switch with a ramp signal provided by the control circuit, and a diode;

a coil having one end connected to the switching mechanism and another end connected to the first output terminal; and a load connected between the first output terminal and the second output terminal and also connected in parallel with the first charge storage unit.

2. The circuit arrangement of claim 1, wherein load paths of the first and second semiconductor switches are connected in parallel, and the first and second semiconductor switches are separately controlled by the control circuit.

3. The circuit arrangement of claim 1, wherein the first semiconductor switch is configured to conduct a greater current than the second semiconductor switch when a same voltage level is applied across load paths of the first and second semiconductor switches.

4. The circuit arrangement of claim 1, wherein the control circuit is configured to turn on the second semiconductor switch prior to turning on the first semiconductor switch.

5. The circuit arrangement of claim 1, wherein the control circuit is configured to turn off the first semiconductor switch prior to turning off the second semiconductor switch.

6. The circuit arrangement of claim 1, further comprising:
   a first resistor; and
   a series connection having the first resistor connected in series with the second semiconductor switch;
   wherein the series connection comprised of the first resistor and the second semiconductor switch is, in turn, connected in parallel with the first semiconductor switch.

7. The circuit arrangement of claim 1, wherein a nominal voltage drop results across the first resistor when a maximum current load flows through the second semiconductor switch and the nominal voltage is applied at the first supply potential terminal.

8. The circuit arrangement of claim 1, wherein the first resistor is a discrete component.

9. The circuit arrangement of claim 1, further comprising:
   a second charge storage unit;
   a second diode;
   a second resistor; and
   a series connection having the second charge storage unit, the second diode and the second semiconductor switch connected in series, with a junction node between the second charge storage unit and said second diode.

10. The circuit arrangement of claim 9, wherein the second charge storage unit is a discrete component.

11. The circuit arrangement of claim 1, wherein the control circuit comprises a clock pulse generator, a pulse width modulator and a driver circuit.

* * * * *